(12) United States Patent
Karaoguz

(10) Patent No.: US 9,467,923 B2
(45) Date of Patent: Oct. 11, 2016

(54) METHOD AND SYSTEM FOR LOCATION-BASED PREARRANGED HAND-OFF

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 638 days.

(21) Appl. No.: 12/366,365

(22) Filed: Feb. 5, 2009

(65) Prior Publication Data

US 2009/0203379 A1 Aug. 13, 2009

Related U.S. Application Data

(60) Provisional application No. 61/026,794, filed on Feb. 7, 2008.

(51) Int. Cl.
*H04W 36/00* (2009.01)
*H04W 36/32* (2009.01)
*H04W 64/00* (2009.01)
*H04W 72/04* (2009.01)

(52) U.S. Cl.
CPC ........... *H04W 36/32* (2013.01); *H04W 64/00* (2013.01); *H04W 72/04* (2013.01)

(58) Field of Classification Search
USPC ......... 455/421, 432.1, 435.1, 436, 450, 464, 455/516
See application file for complete search history.

(56) References Cited

U.S. PATENT DOCUMENTS 6,810,259 B1 * 10/2004 Zhang .................... 455/456.5
7,072,670 B2 * 7/2006 Sato et al. ............... 455/456.1
7,453,838 B1 * 11/2008 Hans et al. .................. 370/328

(Continued)

FOREIGN PATENT DOCUMENTS

EP 1085696 A1 3/2001
EP 1209930 A2 5/2002

(Continued)

OTHER PUBLICATIONS

European Search Report for European Patent Application No. 09001677.5-2414, dated Jan. 17, 2010.

(Continued)

*Primary Examiner* — Kent Chang
*Assistant Examiner* — Scott Au
(74) *Attorney, Agent, or Firm* — Brinks Gilson & Lione

(57) ABSTRACT

Methods and systems for location-based prearranged hand-off are disclosed and may include pre-arranging hand-off of communication services with a mobile communication device (MCD) based on present and future locations of the MCD and the availability of wireless services in the locations. The MCD may include location-determining capability which may include one or more of: a global navigation satellite system, triangulation, and ultra-wideband positioning. A travel route of the MCD may be anticipated utilizing the locations. The travel route may traverse one or more wireless coverage areas and the hand-off of communication services with the MCD may be configured when the MCD is expected to enter a wireless coverage area with a desired network resource allocation, which may include one or more of: bandwidth, data transfer rate, cost, power requirements, channel conditions, quality of service, and secure communications capability. Configurable MCD attributes may include antennas, beam forming, codes, and modulation.

32 Claims, 6 Drawing Sheets

(56) References Cited

U.S. PATENT DOCUMENTS

| | | | |
|---|---|---|---|
| 7,766,692 B2 | 8/2010 | Johnsen et al. | |
| 7,907,568 B2 * | 3/2011 | Klotsche | 370/331 |
| 8,054,802 B2 * | 11/2011 | Burgess et al. | 370/331 |
| 8,353,458 B2 | 1/2013 | Nobutani | |
| 2002/0023245 A1 | 2/2002 | Tokudome | |
| 2002/0094815 A1 * | 7/2002 | Kanerva | 455/445 |
| 2002/0146983 A1 * | 10/2002 | Scherzer | H04W 24/02 455/67.11 |
| 2003/0069043 A1 * | 4/2003 | Chhaochharia et al. | 455/561 |
| 2004/0097253 A1 * | 5/2004 | Malkamaki | H04L 1/1692 455/522 |
| 2005/0026625 A1 * | 2/2005 | Gehlot et al. | 455/456.1 |
| 2005/0070283 A1 * | 3/2005 | Hashimoto | H04W 48/02 455/435.1 |
| 2007/0042785 A1 * | 2/2007 | Nakamata | H04W 76/04 455/450 |
| 2008/0146235 A1 * | 6/2008 | Kang | H04W 36/0077 455/437 |
| 2008/0153483 A1 * | 6/2008 | Abu-Amara | 455/432.1 |
| 2009/0088156 A1 * | 4/2009 | Aaron | 455/436 |
| 2011/0115494 A1 | 5/2011 | Taylor | |

FOREIGN PATENT DOCUMENTS

| | | |
|---|---|---|
| GB | 2 389 015 | 11/2003 |
| WO | 9829975 A2 | 7/1998 |
| WO | 00/07384 | 2/2000 |
| WO | WO01/39522 * | 5/2001 |

OTHER PUBLICATIONS

Rajagopal et al., "GPS based predictive resource allocation in cellular networks." 10th IEEE International Conference on Networks, Aug. 27-30, 2002. XP010603624.

European Office Action for European Patent Application No. 09001677.5-2414, dated Jul. 6, 2011.

* cited by examiner

METHOD AND SYSTEM FOR LOCATION-BASED PREARRANGED HAND-OFF

CROSS-REFERENCE TO RELATED APPLICATIONS/INCORPORATION BY REFERENCE

This application makes reference to and claims priority to, and claims the benefit of U.S. Provisional Patent Application Ser. No. 61/026,794 filed on Feb. 7, 2008.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for location-based prearranged hand-off.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet has become pervasive in mobile communications. The mobile Internet is a common source of everyday information, and easy, versatile mobile access to this data will be taken for granted.

There is an increasing amount of information being transferred (e.g., to and/or from mobile communication devices). Such increasing amounts of information being transferred consume large amounts of bandwidth of current information communication systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for location-based prearranged hand-off, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for location-based pre-arranged hand-off. Exemplary aspects of the invention may comprise pre-arranging hand-off of communication services with a mobile communication device (MCD) based on present and future locations of the MCD and the availability of wireless services in the locations. The MCD may comprise location-determining capability which may comprise one or more of: a global navigation satellite system, triangulation, and ultra-wideband positioning. A travel route of the MCD may be anticipated utilizing the locations. The travel route may traverse one or more wireless coverage areas and the hand-off of communication services with the MCD may be configured when the MCD is expected to enter a wireless coverage area with a desired network resource allocation, which may comprise one or more of: bandwidth, data transfer rate, cost, power requirements, channel conditions, quality of service, and secure communications capability. Physical layer attributes of the MCD 105 may be configured for the hand-off and may comprise antennas, beam forming, codes, and modulation type, for example. The MCD may include a plurality of wireless protocol capabilities.

Figure 1:
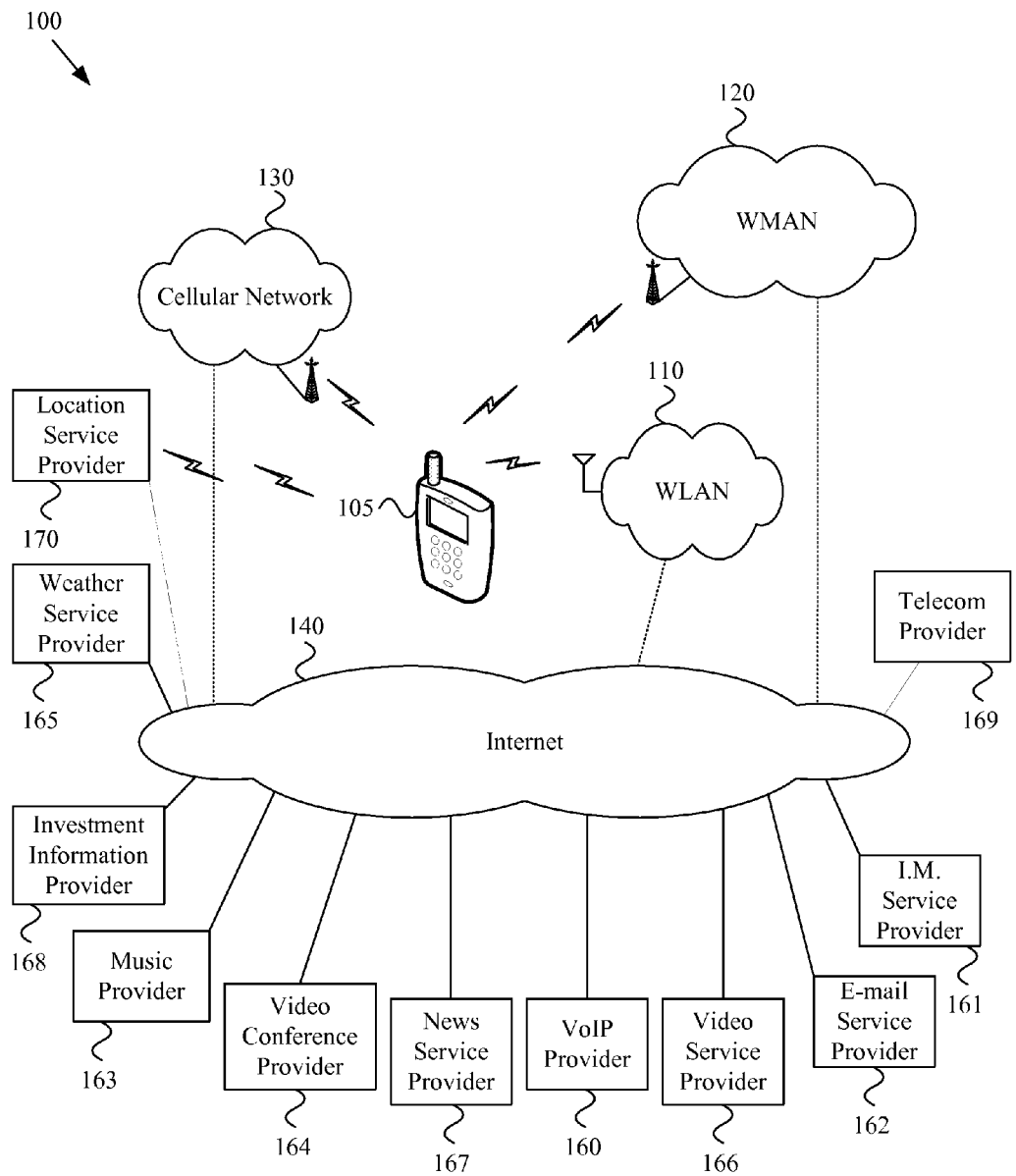
FIG. 1 is a block diagram of exemplary communication services that might be provided by a mobile communication device, in accordance with various aspects of the present invention.

FIG. 1 is a block diagram of exemplary communication services that might be provided by a mobile communication device, in accordance with various aspects of the present invention. Referring to FIG. 1, there is shown an exemplary wireless communication environment 100 comprising a mobile communication device (MCD) 105, a wireless local area network (WLAN) 110, a wireless metropolitan area network (WMAN) 120, a cellular network 130, and the Internet 140. The wireless communication environment 100 may also comprise various service providers that communicate via the Internet 140 such as a telecom provider 169, an instant messaging (IM) provider 161, an email service provider 162, a video service provider 166, a voice over Internet protocol (VoIP) provider 160, a news service provider 167, a video conference provider 164, a music provider 163, an investment information provider 168, a weather service provider 165, and a location service provider. One or more of the service providers may communicate with the MCD 105 via means other than the Internet 140 such as by global location techniques, GPS, for example.

The MCD 105 may comprise suitable circuitry, logic, and/or code that may enable the communication of wireless signals over a plurality of communication protocols, such as cellular, WLAN, WMAN, Zigbee, GPS, and WiMax, for example. The MCD 105 may, for example and without limitation, comprise a cellular telephone, portable email device, handheld computer, laptop computer, mobile gaming platform, mobile media playing device, mobile positioning system, etc.

Media communicated by the MCD 105 may take many forms. Communicated information may comprise media information (e.g., audio, video, graphical, etc.), document information, general data information, person-to-person or group communication information, voice data, videoconference information, advertisement information, map information, travel information, investment information, pictorial information, news information, stock ticker information, for example.

The popularity of mobile communication devices is increasing. Thus, not only is the amount of data per MCD increasing, but the number of MCDs is increasing as well. The available communication bandwidth is limited, in particular over the RF interface. As more wireless communication occurs, the wireless communication environment is becoming more hostile. For example, the amount of interference from the increased number and types of MCDs and increased data traffic per MCD is increasing. All of these factors lead to increasing difficulty and/or complexity in handing off mobile communication devices between communication network access points.

Network access points may, for example and without limitation, comprise cellular base stations, wireless LAN access points, wireless MAN access points, wireless PAN access points, etc. Utilizing location information may allow hand-offs to be prearranged. For example, if it is known that a mobile communication device is going to be transitioning from a first coverage area to a second coverage area, many hand-off preparation activities associated with the pending hand-off may be performed (e.g., by the mobile and/or network) before determining when to perform the hand-off. Prearrangement of hand-offs may, in turn, reduce the real-time complexity of the hand-off.

In a non-limiting example, all (or a substantial portion of) hand-off preparation activities may be performed (e.g., resource allocation, synchronization activities, power control activities, etc.) prior to the time at which the hand-off determination is made. For example, such preparation activities may be initiated and/or performed in advance of the occurrence of traditional hand-off causing signal or channel conditions. In a non-limiting example, the MCD 105 and/or network may be merely waiting for a particular signal or channel quality metric to be reached or a particular signal or channel quality comparison result to be achieved, with most other signal processing activities associated with the hand-off already having been performed. Furthermore, modulation types, such as QPSK, OQPSK, OFDM, for example, may be selected, and antenna systems may be configured, such as for beam forming. In such an exemplary scenario, real-time processing activities associated with a hand-off may be greatly reduced, resulting in an expeditious and efficient MCD 105 hand-off.

Mobile communication devices may be combined with location determination capability. For example, the MCD 105 may have on-board location determination capability such as global navigation satellite systems such as GPS, Galileo, and GLONASS, as well as triangulation, UWB positioning capability, determining location based on locations of known signals and/or networks, for example. Similarly, the MCD 105 may receive information of its location from other devices such as communication network infrastructure devices and/or personal electronic devices with position determining capability.

Location information may comprise any of a large variety of characteristics. For example, location information may comprise characteristics of coordinate information (e.g., longitude/latitude) associated with any of a variety of positioning coordinate systems. Also for example, location information may comprise characteristics of information of particular network coverage areas. Further for example, location information may comprise information of known landmarks (e.g., identified buildings, homes, airports, intersections, campuses, cities, towns, transportation hubs and/or spurs, shopping centers, entertainment venues, etc.).

Figure 2:
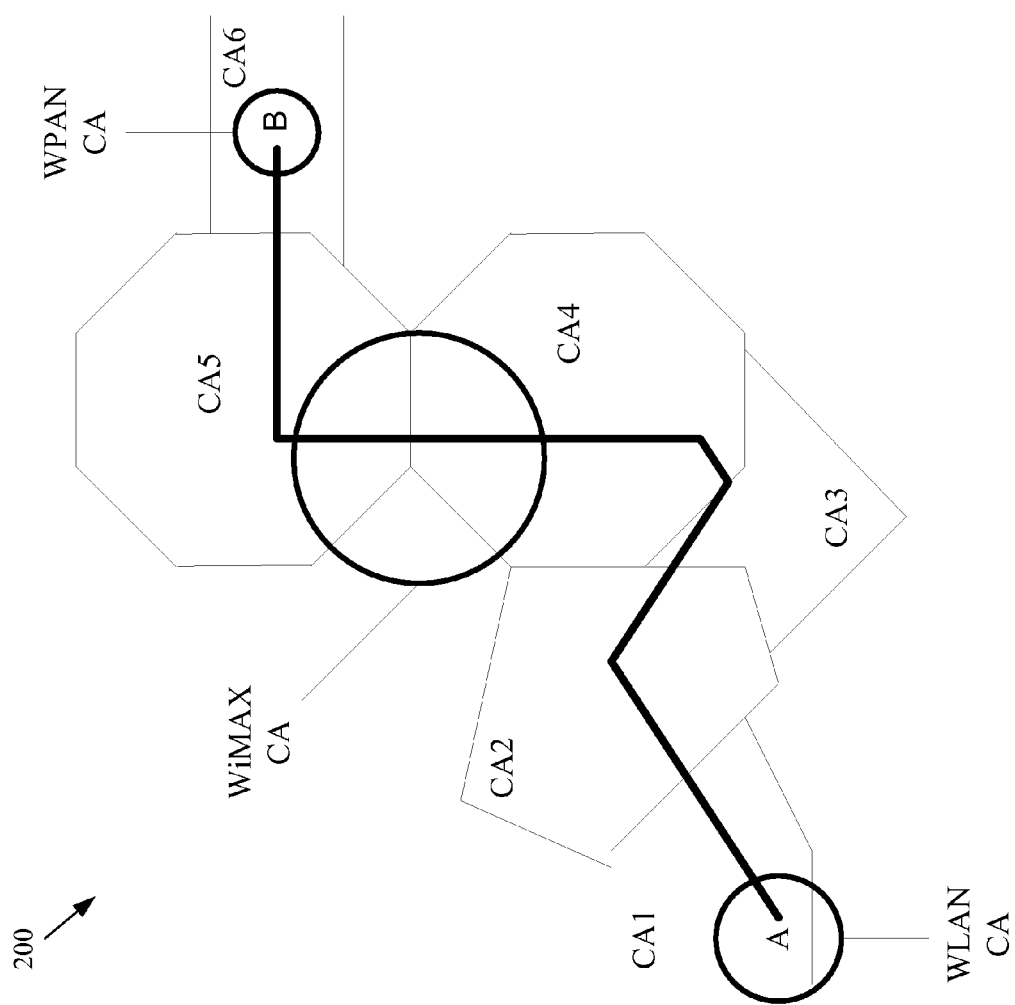
FIG. 2 is a block diagram illustrating an exemplary travel path for a mobile communication device that takes the mobile communication device through a plurality of coverage areas associated with one or more communication networks, in accordance with various aspects of the present invention.

FIG. 2 is a block diagram illustrating an exemplary wireless network and travel path for a mobile communication device, in accordance with various aspects of the present invention. Referring to FIG. 2, there is shown an exemplary wireless network 200 comprising a start point A, an end point B with the travel path indicated by the black line connecting point A to point B, and coverage areas CA1, CA2, CA3, CA4, CA5, CA6, WLAN CA, WiMAX CA, and WPAN CA.

Utilizing location information may allow hand-offs to be efficiently planned and pre-arranged. For example, if it is known that the MCD 105 is going to be transitioning from a first coverage area with a first respective information transfer capability to a second coverage area with a second respective information transfer capability, information transfer may be delayed until the MCD 105 transitions to the second coverage area. For example, the second coverage area CA2 may have higher data-rate capabilities than the first coverage area CA1. In an exemplary scenario, the first and second coverage areas CA1 and CA2 may be associated with different communication networks.

For example, the first coverage area CA1 may be associated with a relatively slow, relatively expensive, or relatively high-power-utilization telecommunication network, and the second coverage area CA2 may be associated with a relatively fast, relatively inexpensive, or relatively low-power-utilization computer network.

In another exemplary scenario, the first and second coverage areas CA1 and CA2 may be associated with the same communication network. For example, first and second cells of a telecommunication network may have, permanently or temporarily, different respective amounts of available bandwidth, different respective channel conditions, and different associated power requirements.

Location information may, at least in part, be specified manually. For example, pre-stored present locations, destinations and/or routes may be selected using keypad or other tactile input feature on the MCD 105, by selecting present location, destination and/or route from a menu. Examples may comprise selecting "home-to-work", "work-to-home", "home-to-airport", school-to-home", "work", "home", "airport", and "friend's house".

In another embodiment of the invention, voice recognition may be utilized such that a user may state the present location, destination and/or route, and voice recognition may be used to attach various location characteristics to the verbal input. For example, a voice input may be matched (e.g., by the MCD 105 or network) to a known stored present location, destination and/or route. Such route determination may, for example, take into consideration known present location and may be combined with a specified destination to determine a path. For example, a GPS module on-board the MCD 105 may know present location, which may be combined with a verbal destination statement to determine a route (or most likely route(s)) for the MCD 105.

In another embodiment of the invention, a graphical user interface (GUI) may be utilized to select a known present location, destination and/or route on a map by using a touch screen, or other GUI. For example, a user may use a mapping utility to call up a map and select or trace a route and/or accept a called-up route. A user of the MCD 105 may, for example, select icons or travel end-points, etc. Such selection may then, for example, be associated with a known route or be characterized as a new route, and may select a set of one or more coverage areas that the MCD will be traveling through. In an exemplary embodiment, a user may be presented with a map or list of selectable coverage areas and/or coverage area combinations.

In an embodiment of the invention, location information may be stored in any of a variety of locations. For example, present location, destination and/or route information may be stored in a memory of the MCD 105. Also for example, such location/route information may be stored in a personal computing device, such as a PC or server, that may be communicatively coupled to the MCD 105. Additionally for example, such location/route information may be stored in a communication network, such as a computer network, a telecommunications network, a base station, a network controller, or a central database, for example. The information may be stored in volatile or non-volatile memory (NVM), such as a removable NVM card or SIM, for example.

In another embodiment of the invention, location information, such as present location, destination and/or route information, for example, may be specified automatically (i.e., without direct user interaction). The MCD 105 may comprise processing capability to determine location—e.g., GPS, tied to known net locations, triangulation, UWB, etc. A mobile communication device (e.g., cellular phone, PDA, handheld computer, personal email device, portable media playing device, portable gaming device, etc.) could provide location information to the communication network. Such location information may, for example, comprise characteristics of present location information, destination information and/or route information.

A system (e.g., on-board the MCD 105, in a device of a communication network, or other device) may track a route that has already been entered to determine whether the route continues to be valid. In such an exemplary scenario, the system may issue a warning (e.g., to the communication network and/or user) when the MCD 105 has strayed from a specified path, such as the path defined by the line connecting point A to point B, for example. The tracked information may be combined with anticipatory route generation. For example, once the MCD 105 is determined to have strayed from a specified path, anticipatory route generation may be utilized to generate a remainder of a path and/or determine when a previously-specified path has been rejoined.

For anticipatory route generation, a system, such as the MCD 105, a communication network device, etc.) may track movement of the MCD 105. The system may use position tracking information to anticipate future movement of the MCD 105 through communication network coverage areas. For example, the system may use tracking information (e.g., along with time and/or day information) to select a path that the MCD 105 is traveling, and then communicate such path information to a device of the communication network or the MCD 105. The system may select an existing stored route or may generate a new route. For example, such selection/generation may depend on how close a presently determined route is to a previously stored route. For example, if a presently determined route is within an error margin of a previously stored route, the previously stored route may be utilized, at least temporarily. The MCD 105 and/or network may, for example, interface with the user during the anticipatory route generation process. For example, a user may be asked to verify a route change or to acknowledge a new determined route.

In another embodiment of the invention, a hybrid manual/automatic route generation process may be utilized. In an exemplary scenario, a user may specify a route. The MCD 105 (or network device or other device) may then use location information to track the route of the MCD 105. For example, the MCD 105 (or other device) may realize that the MCD 105 has strayed from a direct path to work (e.g., stopping for coffee, gas, etc.). In a scenario where the MCD 105 has strayed from an anticipated path (location and/or time), the MCD 105 (or other device) may also realize when the expected path is rejoined (e.g., mobile is through traffic jam or completed refueling). The MCD 105, one or more devices of the communication network, and/or other devices may communicate location or route information with the network. The route information may also generally comprise time information, which may, for example, assist the communication network to know when resources should be allocated to the hand-off preparation activities and the actual hand-off activities. The MCD 105 and/or network and/or other device may perform any of the activities discussed above.

In one non-limiting exemplary scenario, the MCD 105 may provide location information (e.g., present location information, destination information and/or route information) to the network. The information provided to the network may, for example, be mere location information or may be source, destination and/or route information. Portions of the path may be predicted using location information, location-change information, time/day information, etc. Route information may be deterministic, stochastic or a combination thereof. For example, if there is an N % probability of the MCD 105 passing through a particular coverage area during the commute to work, then pre-arrange information transfer. The processing of MCD 105 location information (e.g., present location, destination, intermediate locations and/or route) may comprise correlating such information with network access points and/or associated coverage areas for information transfer. Access points may be computer network access points, telecommunication network access points (e.g., cell base stations), etc.

Traveling from point A to point B, the MCD 105 may pass through cellular telecommunication coverage areas CA1-CA6 and may also pass through an exemplary WLAN coverage area, WiMAX coverage area and WPAN coverage area. Although the illustration in FIG. 2 and the discussion herein generally refer to information transfer between a MCD and respective access points of different communication networks, the principles may be extended to information transfer between a MCD and different access points of the same communication network.

As described previously, portions of path may be predicted, for example, by using location information, location-change information, time/day information, etc. Route information may be deterministic, stochastic or a combination thereof). For example, if there is an N % probability of the MCD 105 passing through a particular cell during the commute to work, then pre-arrange a hand-off. Also, as discussed above, the MCD 105, network device, or other entity may perform predictive location processing. The processing of MCD 105 location information (e.g., present location, destination, intermediate locations and/or route) may comprise correlating such information with network access points and/or associated coverage areas for hand-off.

FIG. 2 provides a non-limiting illustration of a travel path for a MCD that takes the MCD through a plurality of coverage areas associated with a communication network. Note that though the illustration in FIG. 2 and the discussion herein generally refer to hand-off between access points of a particular communication network, the principles may be extended to hand-offs between access points of different respective networks. One or more hand-offs may be prearranged based on the access point(s) between which the hand-off will occur in the future. For example, the system may know that the hand-off is going to happen (or most likely to happen), so the system may perform hand-off preparation activities in advance, rather than, for example, waiting for one or more signal or channel qualities to indicate that a hand-off is temporally near.

For example, the system may set up the entire hand-off and then just wait for a hand-off triggering event (e.g., signal and/or channel conditions, like S/N or SIR conditions, indicating that a hand-off should be performed). Also for example, the system may allocate access point resources (and/or other communication system resources) for the hand-off and communicate information of such allocation in advance of the determination being made to actually perform the hand-off.

Further for example, the communication network may notify the MCD 105 (or the MCD 105 may already know) of the communication parameters (e.g., codes, channels, locations, power, timings, etc.) associated with the next access point so that the MCD may begin listen for communications (to the mobile communication device or with other devices) from the next access point in a targeted or a prioritized manner. For example, a MCD 105 may devote relatively more resources listening for signals associated with a targeted base station than devoted to listening for signals associated with other less likely base stations. On the network side, the base station may also devote relatively more resources to the pending hand-off with the MCD 105 than devoted to a random MCD 105 in a nearby coverage area with which no present association exists. Such prearrangement generally shifts processing, communication and/or resource allocation activities into the non-real-time realm, minimizing the amount of time and resources needed to perform the actual hand-off when the time comes. Such processing shifting may also advantageously affect power consumption.

The prearrangement of a hand-off may, for example, comprise prearranging protocol and/or RF parameters. For example, the type of source and/or channel coding may be pre-specified. In such a scenario, various MCD and/or network components may be configured prior to a hand-off determination being made. In another example, modulation type may be pre-specified (e.g., baseband and/or IF and/or RF modulation).

In yet another example, beam-forming parameters may be prearranged for directing RF energy to/from particular known locations. For example, in an exemplary scenario, the communication network (or MCD or other device) may know that a MCD 105 hand-off is going to occur near a particular location, so the system may direct RF reception/transmission to the particular location. As a non-limiting example, an access point may utilize an antenna array to direct a beam to a particular location at which hand-off of the MCD 105 is expected to occur.

Prearrangement may, for example, comprise general network resource allocation. Such allocated resources may, for example, comprise bandwidth, channels, codes, antennas, etc., for one or more access points. The actual hand-off may be triggered on channel and/or signal conditions or may also be triggered by information other than signal quality information. Such triggering may be based, at least in part, on a combination of location/route information and signal (or channel) quality information. For example, location information may be utilized to initiate prearrangement of a hand-off, and signal and/or channel quality may be utilized to determine exactly when to perform the prearranged hand-off.

Also such hand-off triggering may be based solely on location information, or for example on any information other than channel or signal quality. For example, when a MCD has a location that corresponds to a coverage area of a particular access point, the access point may receive hand-off of the MCD without relying on signal quality measurement. Additionally for example, hand-off may be triggered based, at least in part, on time/day.

A service comprising such prearranged hand-off technology could be part of an enhanced-quality communication service package or may be standard. For example, a consumer may pay relatively more money for a communication service plan that substantially reduces the possibility of dropped calls, poor quality during hand-off, or other mobile communication problems and/or promises particular quality of service. In such a manner, a communication network operator may receive compensation for allocation of resources before such resources are actually used.

Figure 3:
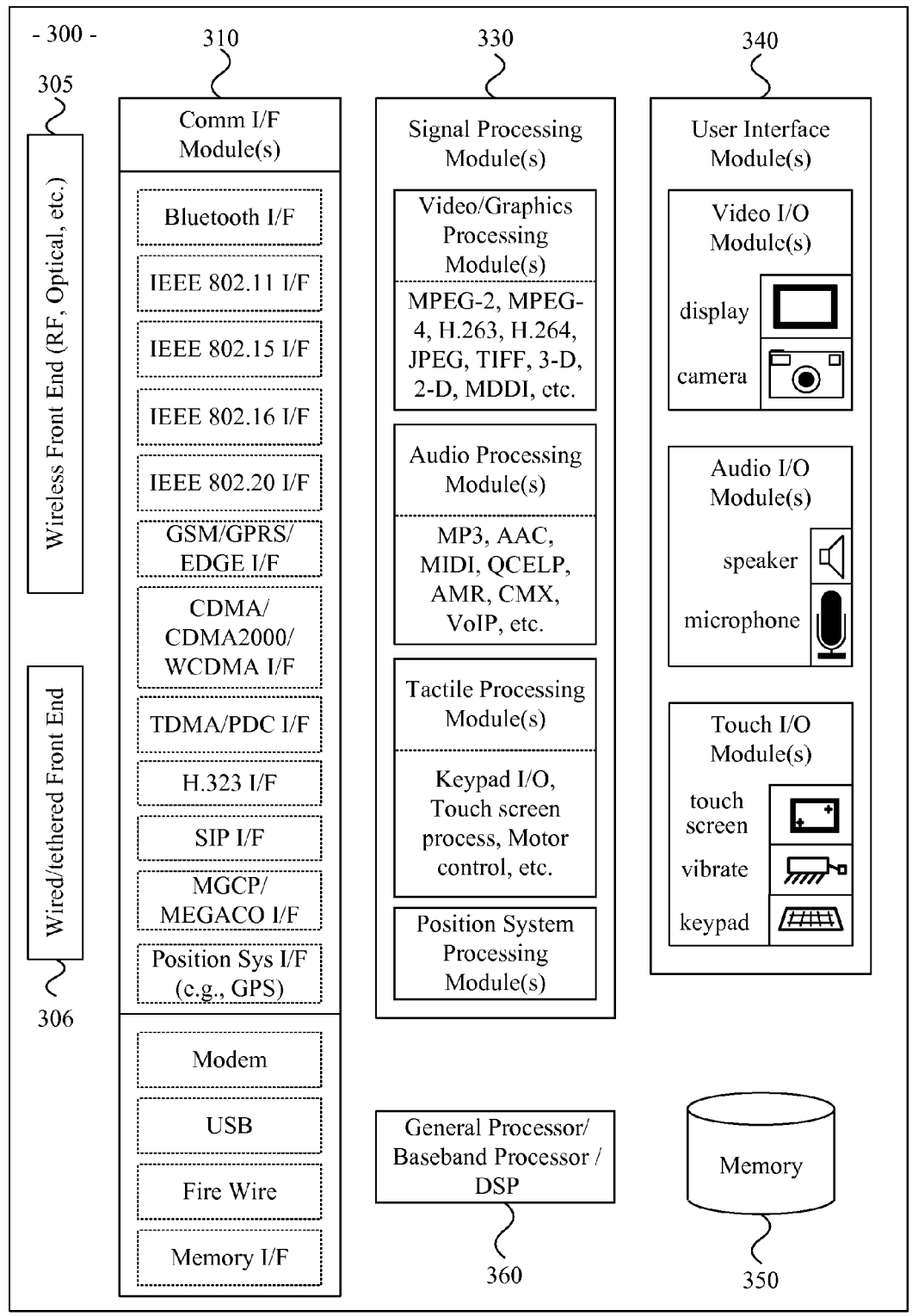
FIG. 3 is a block diagram illustrating a non-limiting exemplary mobile communication device 300, in accordance with various aspects of the present invention.

FIG. 3 is a block diagram illustrating a non-limiting exemplary mobile communication device 300, in accordance with various aspects of the present invention. The exemplary mobile communication device ("MCD") 300 may be substantially similar to the MCD 105 (e.g., sharing any or all characteristics with the MCD 105).

For example, the exemplary MCD 300 may comprise any of a variety of communication interface modules 310, a wireless front end 305 and a wired/tethered front end 306. Also for example, the MCD 300 may comprise a processor 360 and memory 350, which may, for example and without limitation, execute and store executable instructions to implement various functionality discussed previously.

The exemplary MCD 300 is illustrated with a non-limiting exemplary set of communication interface modules 310, including: a Bluetooth interface module, IEEE 802.11 interface module, IEEE 802.15 interface module, IEEE 802.16 interface module, IEEE 802.20 interface module, GSM/GPRS/EDGE interface module, CDMA/CDMA2000/WCDMA interface module, TDMA/PDC interface module, H.323 interface module, SIP interface module, MGCP/MEGACO interface module, modem module, USB module, fire wire module and memory interface module (e.g., for interfacing with off-board or removable memory).

Further for example, the exemplary MCD 300 may comprise any of a variety of signal processing modules 330. The exemplary MCD 300 is illustrated with a non-limiting exemplary set of signal processing modules 330, which may be selectively utilized in accordance with current signal processing needs. The signal processing modules 330 may, for example, comprise various video, audio (e.g., VoIP), textual, graphical and tactile signal-processing modules. The signal processing modules 330 may generally, for example, process information conveyed between the front ends 305 and 306 and communication interface module(s) 310 of the MCD 300 and the user interface module(s) 340 of the mobile communication device 300.

Still further for example, the exemplary MCD 300 may comprise any of a variety of user interface modules 340, at least some of which may be optimizable in accordance with various communication services. The user interface module (s) 340 may, for example and without limitation, comprise any of a variety of video/graphics processing modules, audio processing modules, and tactile signal processing modules. The mobile communication device 300 may also comprise compatible user interface devices corresponding to the various user interface module(s) 340 (e.g., a video display, camera, speaker, microphone, touch screen, keypad, vibrator, etc.). Such user interface modules 340 and/or user interface devices may generally correspond to various communication services that may be provided to a user by the MCD 300.

The exemplary MCD 300 illustrated in FIG. 3 was presented to illustrate a portion of generally broader aspects of the present invention. Accordingly, the scope of various aspects of the present invention should not be limited by characteristics of the exemplary illustration.

Various aspects of the present invention have been described above with the aid of functional (or communication layer) building blocks illustrating the performance of certain significant functions (or communication layers). The boundaries of these blocks and relationships between various blocks have been defined and/or presented for convenience of description. Alternate boundaries or relationships could be defined so long as the certain significant functions are appropriately performed. Such alternate boundaries or relationships are thus within the scope and spirit of the claimed invention. Additionally, the functional (or communication layer) building blocks, and other illustrative blocks, modules and components herein, can be implemented as illustrated or by discrete components, application specific integrated circuits, processors executing appropriate software and the like or any combination thereof. For example and without limitation, any of the previously discussed optimizable PHY layer circuitry may be implemented in a single integrated circuit.

Figure 4:
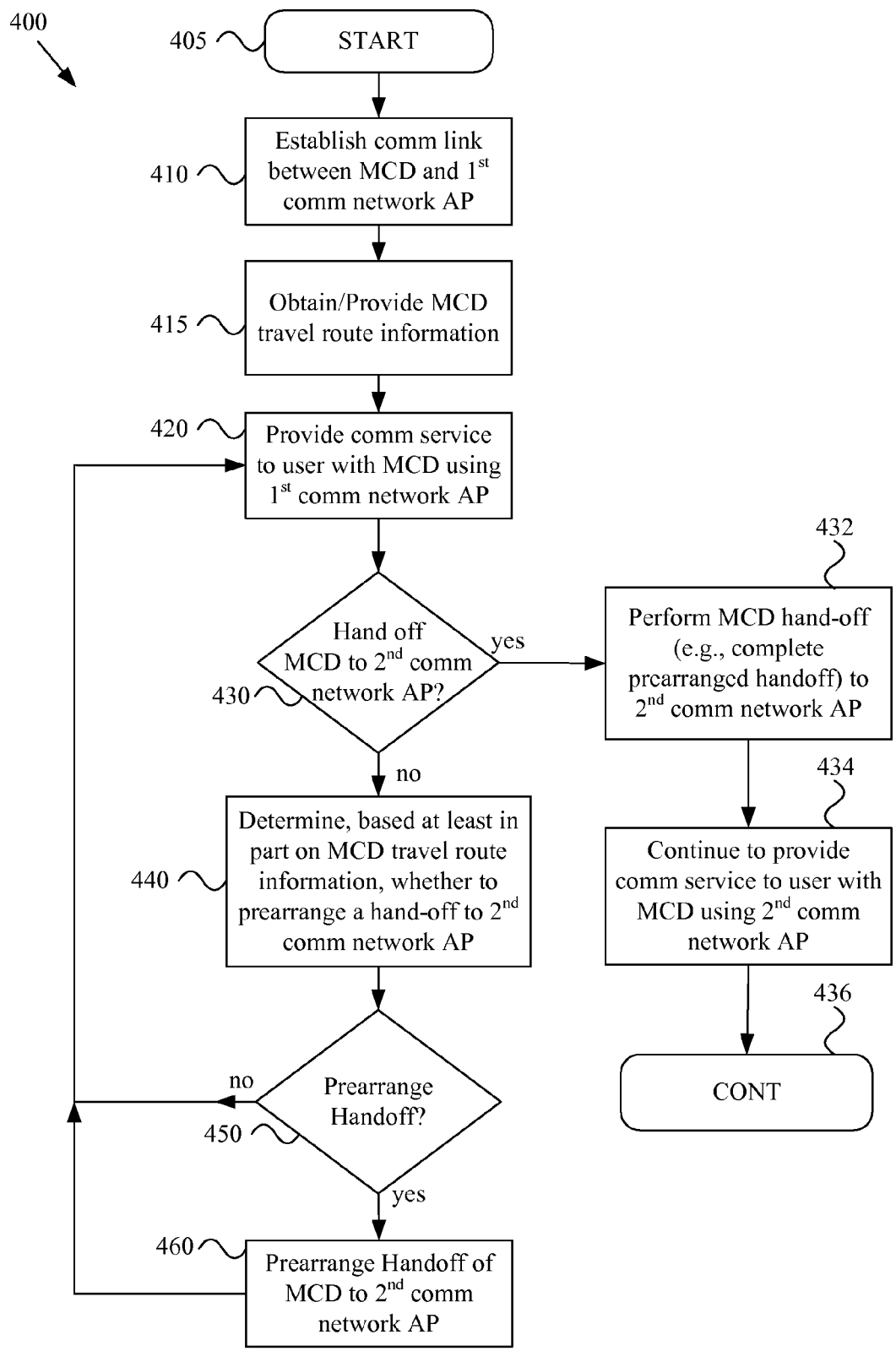
FIG. 4 is a non-limiting illustration of exemplary method steps that a mobile communication device may perform, in accordance with an embodiment of the invention.

FIG. 4 is a non-limiting illustration of exemplary method steps that a mobile communication device may perform, in accordance with an embodiment of the invention. In the exemplary illustration, the hand-off pre-planning and/or pre-arrangement may occur within a second access point while a first access point, such as a cellular communication service, may continue to provide another communication service to the MCD 105.

In step 410, following start step 405, the MCD 105 may establish a communication link between the MCD 105 and a first communication network access point, followed by step 415 where the MCD 105 travel/route information may be obtained to determine/pre-arrange a hand-off. In step 420, communication services may be provided to a MCD 105 user using the first communication network access point, followed by step 430 where it may be determined if a hand-off of the MCD 105 to a second communication network access point should occur. If yes, the exemplary steps may proceed to step 432 where the MCD 105 hand-off, for example a pre-arranged hand-off, may be completed to the second communication network access point before proceeding to step 434 where communication services may continue to be provided via the second communication network access point, followed by the Continue step 436 where the process may continue for other coverage areas.

If, in step 430, a hand-off to the second communication network access point is not to occur, the exemplary steps may proceed to step 440 where it may be determined whether a pre-arranged hand-off to the second communication network access point should occur. In step 450, if it has been determined that a pre-arranged hand-off should occur, the process may proceed to step 460 where a hand-off to a second communication network access point may be pre-arranged, and then proceed to step 420. If in step 450 it had been determined that a pre-arranged hand-off would not occur, the exemplary steps may proceed directly to step 420.

Figure 5:
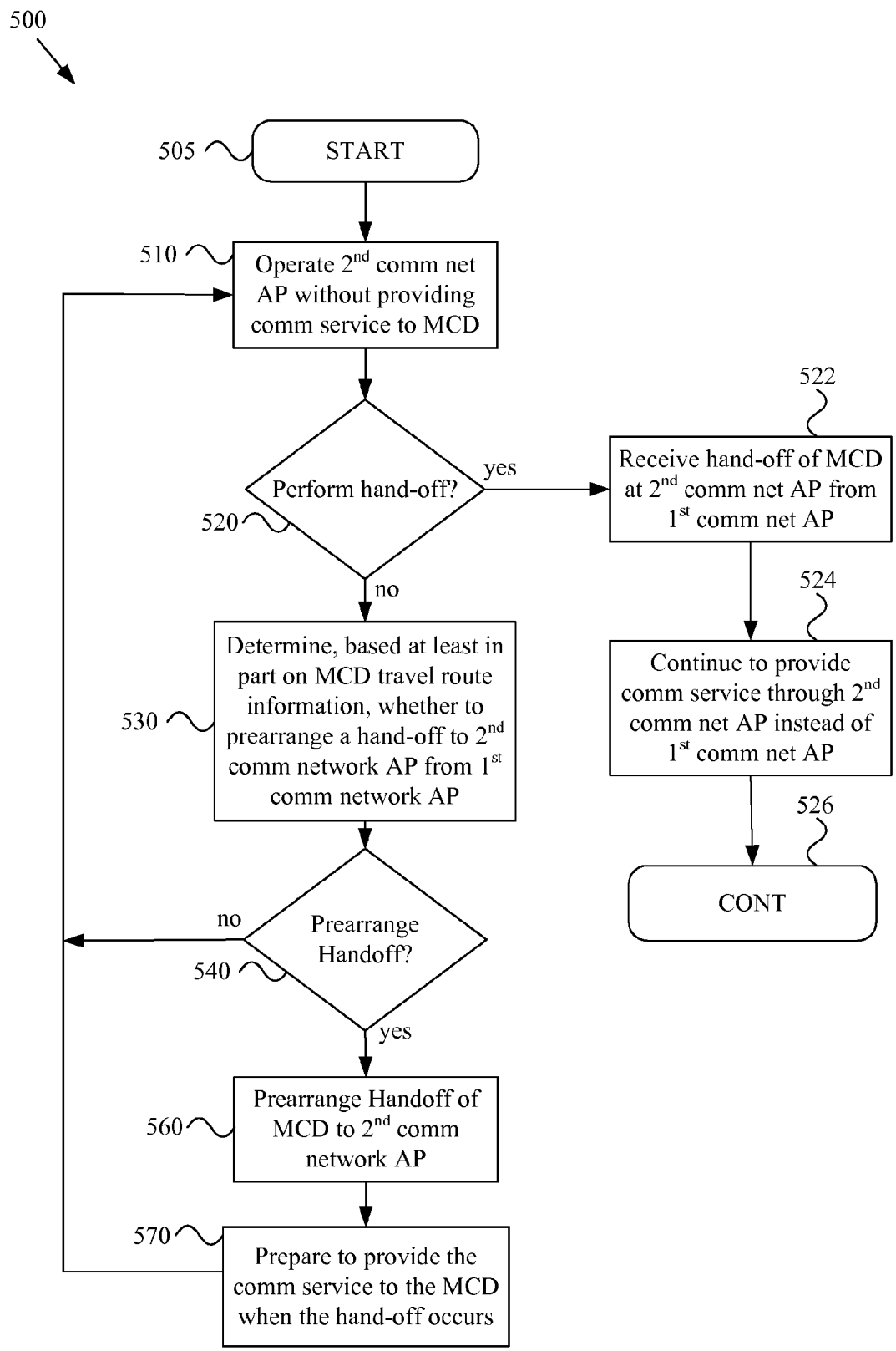
FIG. 5 is a diagram providing a non-limiting exemplary illustration of method steps that a communication network access point might perform, in accordance with various aspects of the present invention.

FIG. 5 is a diagram providing a non-limiting exemplary illustration of method steps that a communication network access point might perform, in accordance with various aspects of the present invention. After start step 505, in step 510, a second communication network access point may operate without providing communication services to the MCD 105. If in step 520, a hand-off is to be performed, the exemplary steps may proceed to step 522 where the second communication network access point may receive the hand-off of the MCD 105 from the first communication network access point, followed by step 524 where communication services may be provided through the second communication network access point instead of the first communication network access point, before proceeding to the Continue step 526 where the process may proceed for other coverage areas and/or access points.

If, in step 520, a hand-off of the MCD 105 does not occur, the exemplary steps may proceed to step 530 where it may be determined, based at least in part on the MCD 105 travel route information, whether to pre-arrange a hand-off to the second communication network access point from the first communication network access point. In step 540, if a hand-off is to be pre-arranged, the exemplary steps may proceed to step 560 where a hand-off of the MCD 105 to the second communication network access point may be pre-arranged, followed by step 570 where communication services may be prepared for when the pre-arranged hand-off occurs. The exemplary steps may then proceed back to step 510. If, in step 540, a hand-off is not to be pre-arranged, the exemplary steps may proceed directly to step 510.

Figure 6:
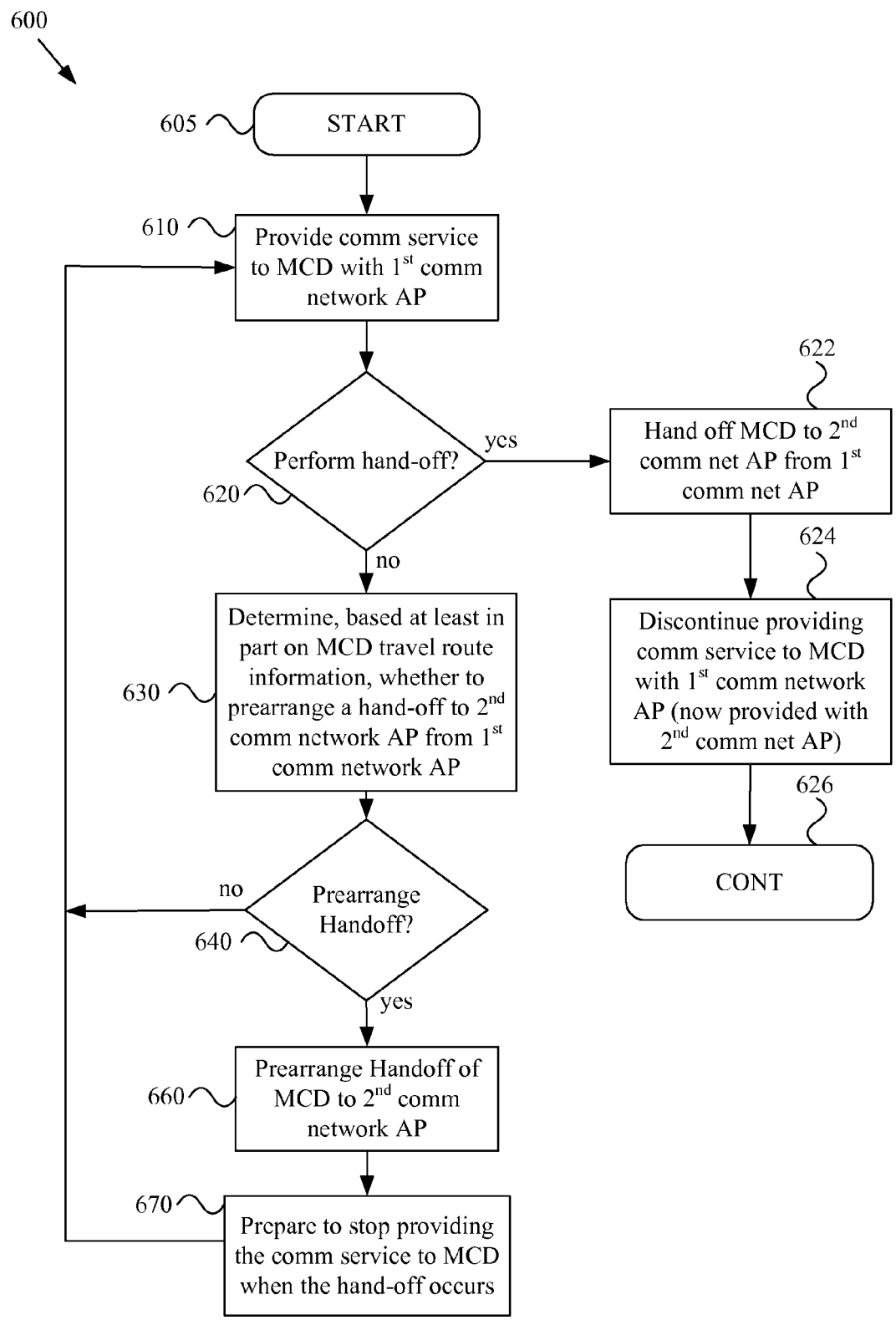
FIG. 6 is a diagram providing a non-limiting exemplary illustration of method steps that communication network access points might perform, in accordance with various aspects of the present invention.

FIG. 6 is a diagram providing a non-limiting exemplary illustration of method steps that communication network access points might perform, in accordance with various aspects of the present invention. After start step 605, in step 610, communication services may be provided to the MCD 105 by a first communication network access point. If, in step 620, a hand-off is to be performed, the process may proceed to step 622, where a hand-off of the MCD 105 may be performed from the first communication network access point to a second communication network access point, followed by step 624 where communication service from the first communication network access point to the MCD 105 may be discontinued, followed by the Continue step 626 where the process may be continued for other coverage areas and/or access points.

If, in step 620, a hand-off of the MCD 105 is not to be performed, the exemplary steps may proceed to step 630 where it may be determined, based at least in part on the MCD 105 travel route information, whether to prearrange a hand-off to the second communication network access point from the first communication network access point. In step 640, if a hand-off is to be prearranged, the exemplary steps may proceed to step 660, where a hand-off to the second communication network access point may be prearranged, followed by step 670, where the first communication network access point may prepare to discontinue providing communication services to the MCD 105. The process may then proceed to step 610. In step 640, if a hand-off is not to be prearranged, the process may proceed directly to step 610.

Note that any of the steps illustrated in FIGS. 4-6 may be performed by other devices, such as, for example, communication network controller devices. For example and without limitation, a network controller, access point and/or MCD may make the ultimate determination of whether to preplan/prearrange the communication of information between the MCD, the first AP, second AP, etc. A service comprising such preplanned or prearranged information transfer technology may be part of an enhanced-quality communication service package or may be standard. For example, a consumer may pay relatively more money for a communication service plan that provides for the pre-arranged hand-offs discussed previously (e.g., to save overall cost, save power consumption, acquire more reliable communication, more secure communication, etc.). In such a manner, a communication network operator may receive compensation for allocation of resources before such resources are actually used.

In an embodiment of the invention, a method and system are disclosed for pre-arranging hand-off of communication services with a mobile communication device (MCD) based on present and future locations of the MCD 105 and the availability of wireless services in the locations. The MCD 105 may include location-determining capability which may include one or more of: a global navigation satellite system, triangulation, and ultra-wideband positioning. A travel route of the MCD 105 may be anticipated utilizing the locations. The travel route may traverse one or more wireless coverage areas CA1-CA6, WiMAX CA, WLAN CA, and WPAN CA, and the hand-off of communication services with the MCD 105 may be configured when the MCD 105 is expected to enter a wireless coverage area CA1-CA6, WiMAX CA, WLAN CA, and WPAN CA, with a desired network resource allocation, which may include one or more of: bandwidth, data transfer rate, beam forming, codes, antennas, cost, power requirements, channel conditions, quality of service, and secure communications capability. Physical layer attributes of the MCD 105 may be configured for the hand-off and may comprise antennas, beam forming, codes, and modulation type, for example. The MCD 105 may include a plurality of wireless protocol capabilities.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for location-based prearranged hand-off.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method, comprising:

determining to pre-arrange, by a second communication network, a hand-off of communication with a mobile communication device from a first communication network to the second communication network responsive to a predicted travel path of the mobile communication device, a coverage area of the first communication network and a coverage area of the second communication networks positioned along the predicted travel path of the mobile communication device;

responsive to determining to pre-arrange the hand-off and prior to the mobile communication device moving into the coverage area of the second communication network, sending, by the second communication network directly to the mobile communication device, a communication parameter for the second communication network to the mobile communication device to facilitate the hand-off, where the mobile communication device has allocated communication resources to listening for communications from the second communication network responsive to a computed probability that the mobile communication device enters the coverage area of the second communication network; and when the mobile communication device is within the coverage area of the second communication network, initiating, by the second communication network, the hand-off in response to a triggering event.

2. The method according to claim 1, further comprising configuring a physical layer attribute of the mobile communication device for the hand-off.

3. The method according to claim 2, wherein the physical layer attribute comprises a beam forming attribute.

4. The method according to claim 1, wherein the triggering event comprises a signal-to-noise ratio exceeding a threshold.

5. The method according to claim 1, wherein the triggering event comprises a signal-to-interference ratio exceeding a threshold.

6. The method according to claim 1, wherein the pre-arranging includes directing an antenna toward a predicted location for the hand-off.

7. The method according to claim 1, where the communication parameter comprises a channel coding parameter.

8. The method according to claim 1, where the communication parameter comprises a beam-forming parameter.

9. The method according to claim 1, further comprising: predicting a particular location where the hand-off is going to occur based on the travel path of the mobile communication device.

10. The method according to claim 9, further comprising: directing an antenna of the second communication network to the particular location.

11. The method according to claim 1, where the communication parameter comprises a timing parameter.

12. The method according to claim 1, where the communication parameter comprises a location associated with the second communication network.

13. The method according to claim 1, where the communication parameter comprises a power parameter associated with the second communication network.

14. A system, comprising:
first circuitry of a connection receiving communication network, the first circuitry configured to determine to pre-arrange a hand-off with a mobile communication device from a connection transferring communication network to the connection receiving communication network, responsive to a predicted travel path of the mobile communication device, the transferring and receiving communication networks positioned along the predicted travel path of the mobile communication device; and
second circuitry of the connection receiving communication network, the second circuitry configured to:
prior to the mobile communication device moving into a coverage area of the connection receiving communication network, send a communication parameter for the connection receiving communication network directly to the mobile communication device to set up the hand-off for the mobile communication device, where the mobile communication device has allocated communication resources to listening for communications from the second communication network responsive to a computed probability that the mobile communication device enters the coverage area of the connection receiving communication network;
after sending the communication parameter, wait for a hand-off triggering event; and
initiate the hand-off in response to the triggering event.

15. The system according to claim 14, wherein the hand-off is initiated when the mobile communication device is known to enter a wireless coverage area of the receiving communication network.

16. The system according to claim 15, wherein the wireless coverage area includes a network resource allocation at a predetermined level.

17. The system according to claim 16, wherein the network resource allocation comprises a secure communications configuration.

18. The system according to claim 14, wherein pre-arranging the hand-off includes management of a physical layer attribute of the mobile communication device for the hand-off.

19. The system according to claim 18, wherein the physical layer attribute comprises a beam forming attribute.

20. The system according to claim 14, wherein the first circuitry is further configured to arrange the hand-off with the mobile communication device from the connection transferring communication network to the connection receiving communication network by monitoring for the triggering event.

21. The system according to claim 20, wherein the first circuitry is further configured to perform the monitoring for the triggering event when the mobile communication device is expected to be in proximity of an upcoming access point of the receiving communication network.

22. The system according to claim 20, wherein the first circuitry is further configured to perform the monitoring for the triggering event with a reduction in power allocated to monitoring for the triggering event.

23. A product, comprising:
a machine readable medium other than a transitory signal; and
instructions stored on the medium for execution by a processor in a connection receiving communication network, the instructions configured to cause the processor to:
determine whether to pre-arrange a hand-off of a connection from a connection transferring communication network to the connection receiving communication network, responsive to a predicted travel path of a mobile communication device;
responsive to determining to pre-arrange the hand-off and prior to the mobile communication device moving into a coverage area of the connection receiving network, transmit, directly from the connection receiving network to the mobile communication device, a communication parameter for the connection receiving communication network to facilitate the hand-off, where the mobile communication device has allocated communication resources to listening for communications from the connection receiving network responsive to a computed probability that the mobile communication device enters the coverage area of the connection receiving network;
after transmitting the communication parameter, identify a triggering event; and
initiate the hand-off upon the identification of the triggering event.

24. The product according to claim 23, wherein the networks are along the predicted travel path of a mobile communication device, and wherein the hand-off is based on wireless services available along the predicted travel path.

25. The product according to claim 24, wherein the instructions are further configured to configure the hand-off based on when the mobile communication device is expected to enter a wireless coverage area.

26. The product according to claim 25, wherein network resource allocation of the wireless coverage area comprises a secure communications configuration.

27. The product according to claim 24, wherein the instructions are further configured to set a physical layer attribute of the mobile communication device for the hand-off.

28. The product according to claim 27, wherein the physical layer attribute includes a beam forming attribute.

29. The product according to claim 23, wherein the connection receiving communication network has a higher data-rate capability than the transferring communication network.

30. The product according to claim 23, wherein the instructions are configured to pre-arrange the hand-off by directing an antenna array toward a predicted location for the hand-off prior to the trigger event.

31. The product according to claim 23, wherein the mobile communication device is with a coverage area of the transferring communication network when the receiving communication network sends the communication parameter directly to the mobile communication device.

32. The product according to claim 23, wherein the predicted travel path further comprises time information.

* * * * *